United States Patent [19]

Kazierod

[11] 4,314,758
[45] Feb. 9, 1982

[54] SPECIAL EFFECTS PHOTOGRAPHIC PRINTING EASEL ARRANGEMENT

[76] Inventor: William E. Kazierod, 130 E. Bernice Dr., Northlake, Ill. 60164

[21] Appl. No.: 960,920

[22] Filed: Nov. 15, 1978

[51] Int. Cl.$^2$ ............................................. G03B 27/52
[52] U.S. Cl. ......................................... 355/40; 354/4; 354/121; 355/73; 355/77
[58] Field of Search ...................... 355/40, 52, 73, 77; 354/4, 121

[56] References Cited

U.S. PATENT DOCUMENTS

| | | | |
|---|---|---|---|
| 2,830,491 | 4/1958 | Domeshek | 355/52 X |
| 2,981,148 | 4/1961 | Sausele | 355/40 |
| 3,004,469 | 10/1961 | Broyer | 354/121 X |
| 3,072,014 | 1/1963 | Rawstron | 354/4 |

Primary Examiner—Richard A. Wintercorn
Attorney, Agent, or Firm—McWilliams, Mann & Zummer

[57] ABSTRACT

A special effects photographic printing easel arrangement comprising a circular easel bed mounted on a portable base for rotational adjustment about the axis of the easel, with the device including a releasable locking arrangement to selectively hold the easel bed against rotation, and the easel bed being mounted for use in a horizontal plane or optionally tilted relative to the horizontal at any position about the easel axis. The easel bed has its upper printing surface equipped with a scale of angular subdivisions radially disposed thereabout that cooperate with a stationary datum marker mounted on the base and cooperating with the rim of the easel bed, and a set of circular masks for making multi images of a predetermined but variable whole number, which governs the mask employed, in a circular pattern about the printing paper. The scale of the easel bed, the masks, and the stationary datum marker are integrated in an index system for forming the selected number of images one at a time in a circular pattern about the printing paper. The easel arrangement is also equipped for convex and concave shaping of printing paper for arcuate printing effects as well as for standard flat printing purposes.

8 Claims, 15 Drawing Figures

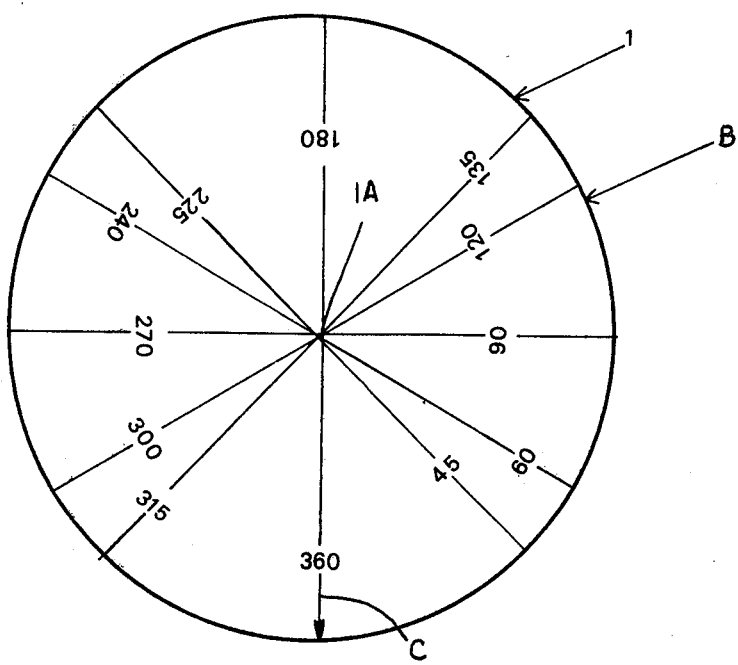
FIG. 2
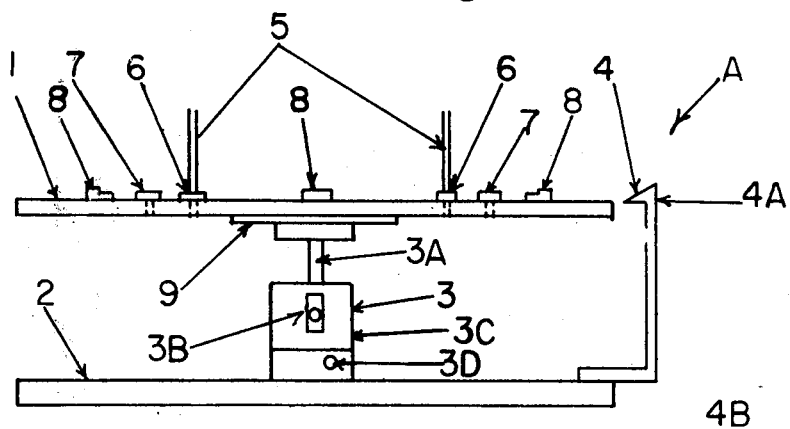
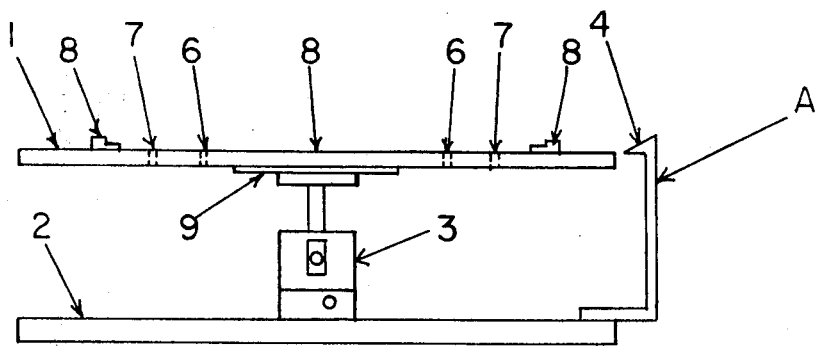
FIG. 4

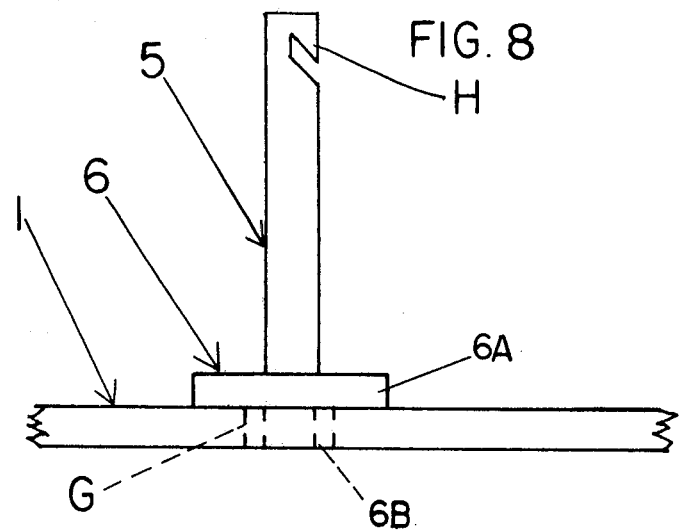
FIG. 8
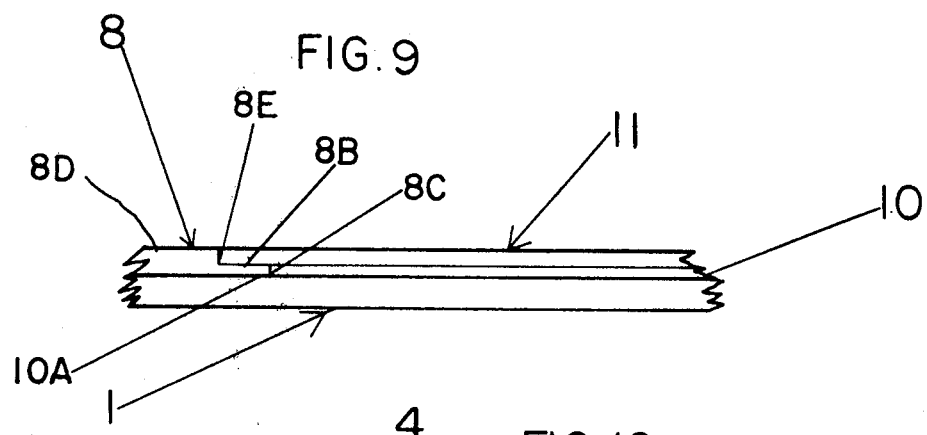
FIG. 9
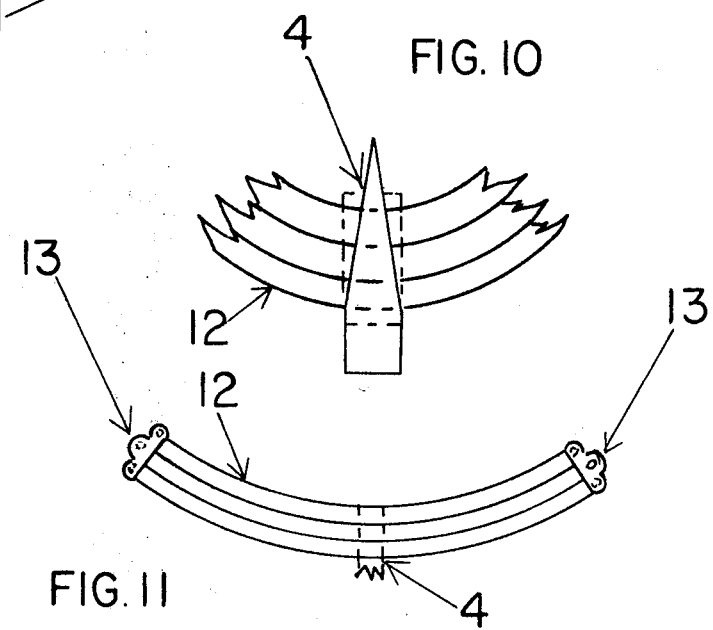
FIG. 10
FIG. 11

SPECIAL EFFECTS PHOTOGRAPHIC PRINTING EASEL ARRANGEMENT

This application is a substitute for my abandoned application Ser. No. 757,839, filed Feb. 17, 1977, the entire disclosure of which is hereby incorporated herein by this reference.

Conventional photographic printing easels available on the market are usually limited in their use to holding photographic printing paper of a selected margin for straight printing purposes, and with or without a border, for the various sizes of photographic printed compositions.

The practice of the photographic printing arts can achieve unusual and distinctive effects using printing techniques employing the conventional enlarger, such as reproducing the image that is defined by the negative in a predetermined grouping on the printing paper, or by applying the negative image to printed paper that is positioned otherwise than perpendicular to the projection of the image from the enlarger.

Flynn U.S. Pat. No. 2,654,289 and Freund et. al. U.S. Pat. No. 3,588,248 disclose easel arrangements for making photomontages using masking techniques, but the easels involved are structurally complicated and require a high degree of skill to operate effectively.

Abbott U.S. Pat. No. 2,565,446 is concerned with a photographic easel arranged to hold a sheet of printing paper in curved, twisted, undulated, and other non-planar conditions for the purpose of obtaining a distorted image as the printing result for artistic purposes. However, this easel provides no capability of facilitating the production of photomontages.

A principal object of this invention is to provide a special effects printing easel device of few and simple parts that permits ready printing of multi image photographs radially composed about the printing paper, in which the printing is done in a circular pattern utilizing an index system that insures accuracy and good results conveniently obtained.

Another important object of the invention is to provide a special effects printing easel arrangement that permits the same easel to tilt at selected angles relative to the direction of application of the image from the enlarger, as well as to accommodate mounting of the printing paper in concave or convex shaping free of creasing for achieving varient types of printing results.

Another important object of the invention is to provide a method of making multi image prints in a circular pattern on the same piece of printing paper using a special easel indexing technique that avoids errors while providing for considerable simplification of the equipment required.

Yet other objects of the invention are to provide a special effects easel device that is free of any substantial structural complications, that permits amateurs to print creatively with professionally competent results, that is economical to manufacture, convenient to use, and long lived in operation.

In accordance with the invention, a special effects photographic printing easel device is provided comprising a circular easel bed that is mounted on a suitable supporting base for rotational adjustment movement about the central axis of the easel, with the device including a releasable locking arrangement to selectively hold the easel against rotation, and the easel bed being mounted for use in a horizontal plane, or upwardly tilted relative to the horizontal. The easel bed defines an upwardly facing printing surface against which the photographic printing paper to be exposed is applied. In the easel arrangement of this invention, the easel bed printing surface is equipped with a scale of angular subdivisions centered on the easel axis that are related to angles that divide into 360 with a whole number quotient, which whole number is the number of images that the photographic practitioner will be making in a circular pattern for forming photomontages and the like, in practicing this invention.

The easel bed surface is further delineated to define a zero datum extending radially of the bed surface and bisecting the space between two of the indicated angular subdivisions to form an initial printing position on the easel bed. Cooperating with the rim of the easel bed is a stationary datum marker secured to the base and disposed adjacent the easel bed rim for cooperation with the easel bed scale. The easel device in its operative position is disposed relative to a suitable enlarger so that the image of the negative is properly directed at the printing paper portion that is exposed at the easel initial printing position, when printing is to be effected.

The invention is also concerned with the provision of a series of circular masks that are proportioned to cover the printing paper applied to the easel bed, to which multiple images are to be applied. Each mask is shaped to define an open sector forming spaced apart side edges that are radially disposed relative to the mask to define the angle that forms the divisor into 360 which gives the number of printing images available using the mask in question.

In the illustrated embodiment of the invention, the easel scaling, masks, and stationary marker provide availability to reproduce multi images in groups of three, four, six, or eight, one at a time, in a circular pattern about the printing paper, in a consistent, accurate matter.

The easel bed itself is equipped to receive photographic printing paper of the usual quadrilateral configuration yet also provide for rotatably mounting on the bed over the printing paper the mask that has been selected to provide the number of images desired for a particular printing operation.

The easel bed scaling, the easel bed datum zero, the easel device datum marker, and the masks involved are integrated in an indexing system whereby the mask providing the desired number of images that has been selected can initially be correctly positioned relative to the photographic paper for application of the first image thereto through the open section of the mask, and at the initial printing position of the easel, after which the easel bed and mask are moved relative to each other to, in sequence, expose the next area of the photographic paper to be printed; this procedure is followed in a circular manner about the printing paper until the number of images selected has been formed on the printing paper.

The images provided may be all the same or one or more may be different, at the option of the user, by suitable adjustment of the negative as applied to the enlarger.

The easel bed is also equipped to mount for printing purposes the printing paper in convex and concave shaping for providing arcuate printing effects, as well as for standard flat or straight on printing purposes.

Other objects, uses, and advantages will be obvious or become apparent from a consideration of the following detailed description and the application drawings.

In the drawings:

FIG. 2 is a plan view of the easel bed top surface showing only the special scaling arrangement that is an important part of this invention;

FIG. 3 is similar to that of FIG. 1 with the implements shown in FIG. 1 disposed to provide for printing a horizontal composition;

FIG. 4 is a view similar to that of FIGS. 1 and 3, but showing the easel bed arranged for multiple image printing use;

FIG. 8 is a fragmental sectional view on an enlarged scale showing one of the paper edge holding implements of FIG. 6;

FIG. 9 is a view similar to that of FIG. 8, but illustrates the manner in which the printing paper and mask are applied to the easel for forming the multi image printing paper exposure procedure of this invention;

FIG. 10 is a fragmental view on an enlarged scale illustrating in plan an alternate manner of mounting the easel stationary datum marker on the device base;

FIG. 11 is similar to FIG. 10 and illustrates the mounting track arrangement for the base datum marker of FIG. 10;

Figure 1:
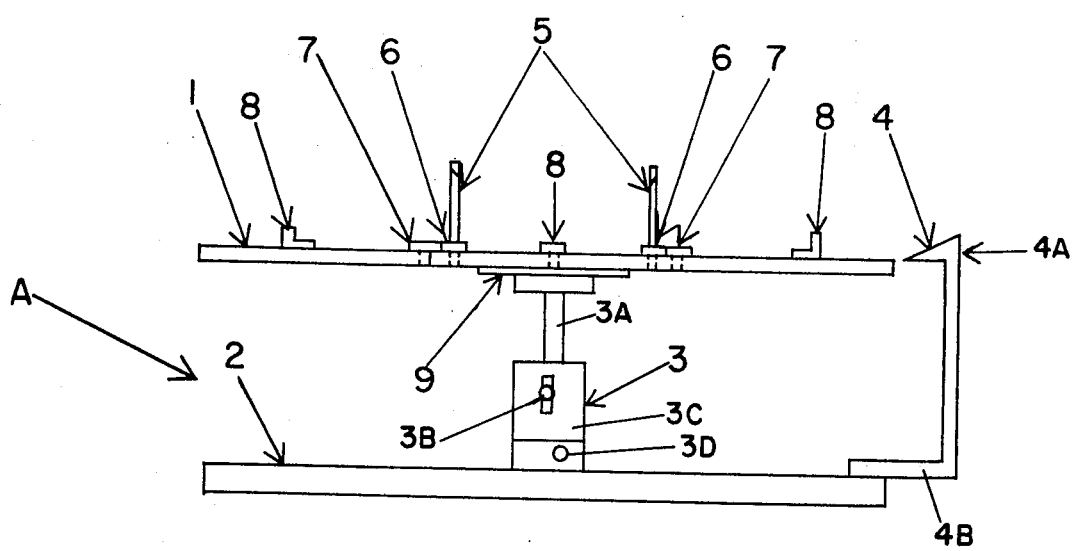
FIG. 1 is a side elevational view diagrammatically illustrating one embodiment of the invention and showing applied to the easel bed several types of implements for effecting the special shaping of the photographic printing paper that is suggested by FIGS. 6 and 7.

However, it is to be understood that the specific drawing illustrations provided are supplied primarily to comply with the requirements of the Patent Laws, and that the invention is susceptible of other embodiments that will be obvious to those skilled in the art, and which are intended to be covered by the appended claims.

Reference letter A generally indicates one embodiment of the invention which comprises easel bed 1 that is in circular or disc form and can be conveniently made from plywood or the like. In the illustrated embodiment, the easel bed is formed from a sheet of plywood ⅜ inch thick.

The bed 1 is mounted on suitable base 2, which in the form illustrated is also of circular configuration and is formed out of a sheet of plywood having a thickness of ½ inch.

The bed 1 is mounted on the base 2 by mounting device 3 that is in the form of a head of the type customarily and conventionally employed on tripods for cameras and the like; for this purpose, mounting plate 9 is suitable secured to the underside of the bed 1 at its center and has the tripod head 3 suitably affixed thereto so that the shank 3A of the head is aligned with the axial center 1A of the bed 1. As is conventional, the tripod head shank 3A has a ball (not shown) seated in a socket in the head cylindrical housing 3C, which also includes a conventional lock and release mechanism indicated at 3B for releasably securing the bed 1 against tilting with respect to base 2. The head housing 3C is mounted for rotatable adjustment movement about its central axis, and may be set against such movement by suitable clamp device 3D. As is conventional with tripod heads of the type indicated, the tilting capability provided is available in any position 360 degrees about the circumference of the base 2. The head 3 is only diagrammatically illustrated as its component parts are well known expedients, per se, the specific head 3 that is illustrated being the Brooks head sold by Brooks Photo Accessories under the trademark BROOKS. Any mechanism that will provide for the indicated movements of bed 1 and securement against same will serve the purpose.

As indicated in FIG. 2, the bed 1 has its upper surface delineated to define a scale B that comprises a plurality of angular subdivisions which extend radially of the bed, starting from a datum zero line C and measuring counterclockwise about the bed 1. Scale B and the datum zero C, in accordance with the invention, are utilized in conjunction with masks 11 (see FIGS. 12-15) and a datum marker 4 in the form of an arrow type indicator to provide multi image prints in a circular pattern of a preselected number, which number is selective of the specific mask of FIGS. 12-15 that is to be employed for making the particular photomontage that is involved.

The masks 11 are all similar in that they are formed from a suitable light impervious material, such as medium weight black cardboard or posterboard cut to a circular configuration and each having a sector removed therefrom that is sized in accordance with the number of images to be provided using the particular mask employed.

It is a feature of the invention that the masks 11 of FIGS. 12-15 have their open sectors proportioned such that the side edges D and E of same intersect at the axial center of the mask at an angle that divided into 360 with an whole number quotient that equals the number of images that will be made, using the mask in question, in practicing this invention. In the masks illustrated, the number of images available may be three, four, six, or eight in accordance with this principle.

Figure 12:
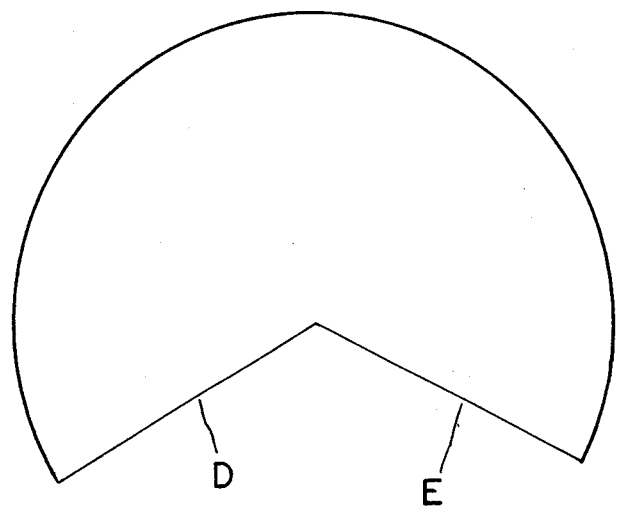
FIG. 12 is a plan view of one of the masks used in practicing the present invention, with the mask of FIG. 12 being employed to provide three images in a circular pattern on the printing paper using the easel device of this invention.

Thus, with regard to the mask of FIG. 12, the mask section has an angle of 120 degrees which is the divisor that gives the whole number quotient 3. Using this mask as described hereinafter, three images will be applied to the printing paper.

Figure 13:
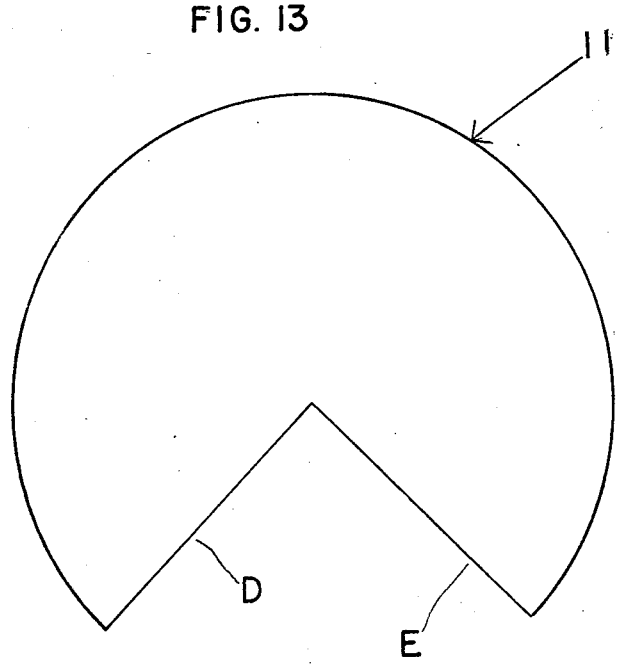
FIG. 13 is similar to that of FIG. 12 but illustrates the mask arrangement for providing four of such images.

Similarly, the mask of FIG. 13 has a 90 degree angle open sector which is the divisor that gives the whole number quotient 4; thus four images will be provided using this mask.

Figure 14:
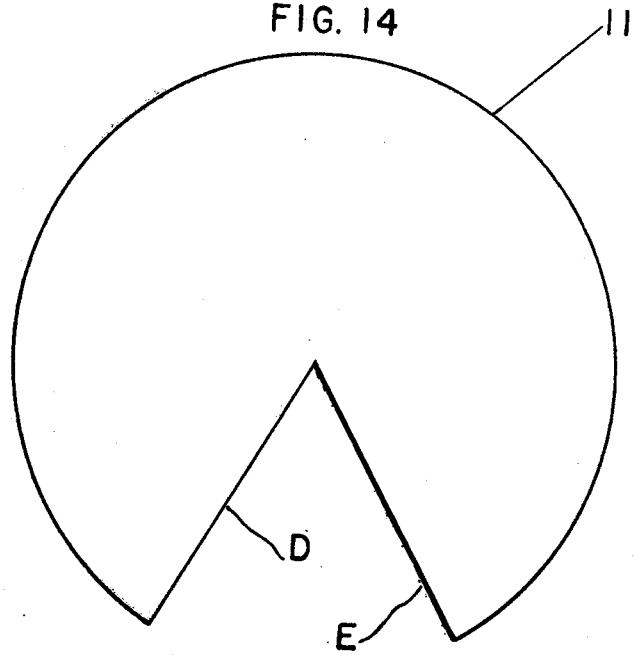
FIG. 14 is similar to that of FIG. 12, but illustrates the mask employed for providing six images.
Figure 15:
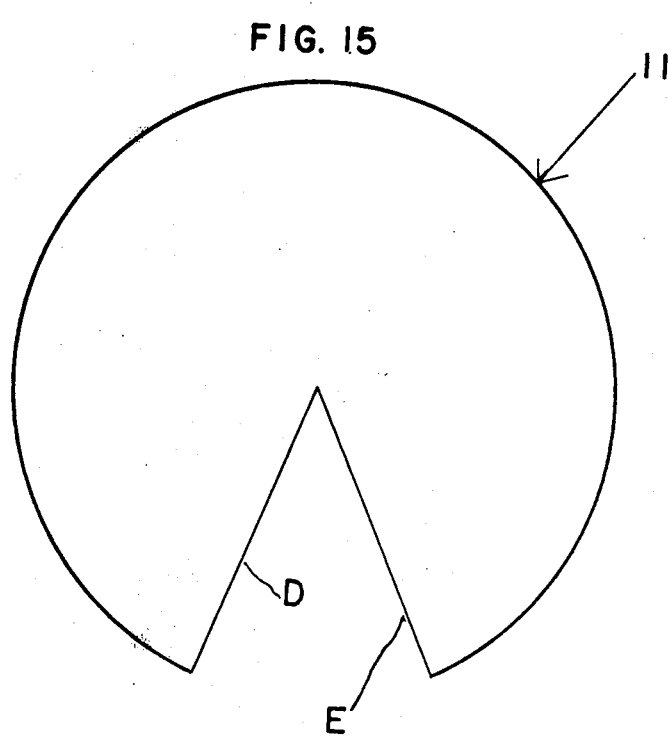
FIG. 15 is similar to that of FIG. 12, but illustrates the mask employed for providing eight images in the practice of the invention.

Likewise, the mask 6 of FIG. 14 has its open sector angle at 60 degrees, which provides the whole number quotient 6, and the angle of the open sector of the mask of FIG. 15 is 45 degrees, which provides the whole number quotient 8, in accordance with the above indicated principles. Use of the mask of FIG. 14 will provide six images, while use of the mask of FIG. 15 will provide eight images.

The exact relationship of the indicated masks 11 with the easel bed scale B and the datum marker 4 will be further elucidated in connection with the description of use of the invention that appears hereinafter.

Further in accordance with the invention, the device arrangement A has associated therewith for use in connection with the board 1 implements in the form of removable stays in the form of brass tubes 5 and washer type stays in the form of bolt shaped washers 6 and 7 which may be formed from any suitable elastomeric or so called plastic material, and the stepped marginal pieces or components 8 that may be suitably formed from brass or the like.

Figure 5:
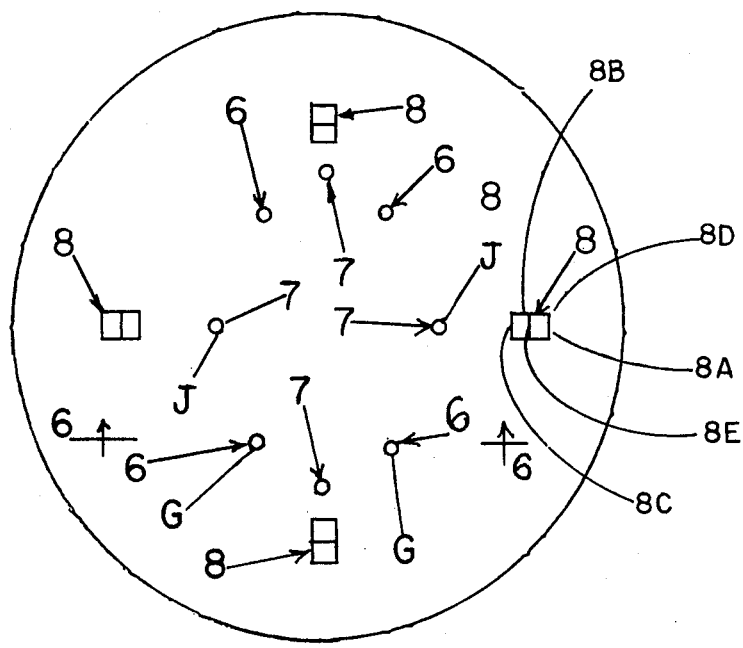
FIG. 5 is a top plan view of the easel bed as shown in FIG. 4, with the scaling of FIG. 2 and the implements of FIG. 1 omitted.

The marginal pieces 8 are indexing and centering implements employed when utilizing the device A to provide the indicated multiple image prints. In the embodiment illustrated, four of the marginal pieces are employed and they serve the dual purpose of defining the mounting position of the printing paper employed and the operating position of the particular mask 11 that is employed in conjunction with a particular multi image printing job. In this connection, FIGS. 2 and 5 shown the top of bed 1 in the same orientation; thus the two marginal pieces 8 at the upper and lower sides of FIG. 5 lie on and are bisected by the datum zero line C and its extension as the 180 degree subdivision line. The other two marginal pieces 8 are similarly located on the 60 degree and 270 degree subdivision lines of scale B.

The marginal pieces 8 are suitably formed from brass or the like and each comprises a body 8A (see FIGS. 5 and 9) defining a lower land portion 8B terminating at the side thereof facing the axial center of the bed 1 in an upstanding shoulder 8C against which the straight side edge of a sheet of photographic printing paper is disposed to center the printing paper with respect to the bed 1, and specifically its central axis. The bodies 8A include an upper land portion 8D defining a curvilinear shoulder 8E against which the marginal edge of the mask 11 employed is to be disposed for guiding relation therewith when the masks are shifted with respect to the bed 1 about its axis.

The marginal pieces or components 8 are suitably fixed or adhered to the bed 1 and are proportioned and positioned so that the printing paper of a predetermined size, as for instance a 14 inch by 14 inch printing paper, will have its respective side edges engaged by the shoulders 8C where applied to the bed 1. For this purpose the marginal pieces 8 are positioned radially of the bed 1 in the manner indicated in FIG. 5 and with a spacing such that opposed shoulders 8C will be 14 inches from each other.

Further in accordance with the invention, the shoulders 8E of the marginal pieces 8 are struck on an arc that complements the diameter of the masks 11. It is a feature of the invention that the masks 11 when employed as herein disclosed, rest on the marginal piece lands 8B and in effect are journaled for adjustment movement relative to the bed 1 within and by the marginal piece shoulders 8E. Thus, as indicated in FIG. 9, where reference numeral 10 indicates the printing paper itself, the printing paper 10 has its under or non-light sensitive side placed in engagement with the upper surface of the bed 1 and its respective side edges 10A disposed in substantial abutting relation with the marginal piece indexing walls 8C. The mask 11 employed is coaxially centered with respect to the easel bed 1, and the thusly disposed printing paper 10, by being received on the marginal piece lands 8B in journaling or camming relation to the arcuate wall surfaces 8E. As is further indicated in FIG. 9, the land 8B of the marginal pieces is defined by a marginal piece flange portion having a thickness approximating that of the printing paper 10, and the thickness of the marginal piece in the area of the land 8D is such that the depth of the journaling wall 8E approximates the thickness of the mask 11 for guiding retention of the mask 11 within its desired circular path of operation on the top of easel bed 1 in practicing the method of this invention. While the illustrated embodiment of the invention involves four of the indicated marginal pieces or components 8, obviously additional sets, preferably arranged in equally spaced opposed pairs, may be employed, such as six or eight of such implements.

In the embodiment illustrated, the marginal pieces 8 have their shoulders 8A of rectilinear straight line configuration for their full length for engagement with the straight sides of the printing paper to center the paper with respect to the bed 1 and its axis of rotation. This will dispose the corners of the printing paper intermediate adjacent marginal pieces 8. However, the flange portions defining the marginal piece lands 8B may be shaped instead to receive the corners of the printing paper, for centering the printing paper relative to the bed 1; for that embodiment the walls 8C would be in the form of two surfaces extending normally of bed 1 in a vertical direction and intersecting at a right angle to define a right angle notch in the lands 8B for receiving the printing paper corners.

It will be understood, of course, that when the paper 10 is applied for multiple image printing purposes, the implements 5, 6 and 7 are not employed so that the paper 10 will rest flush against the upper surface of bed 1, and the mask 11 that is employed will rest flush against the sensitized surface of the paper 10, as well as on lands 8B.

The size of the masks 11 employed in terms of their diameter is determined by the diameter of the easel bed 1 and the size of the printing paper to be employed in connection with the bed 1. For purposes of disclosure, it is assumed that the marginal pieces 8 are disposed to center printing paper of 14 inch by 14 inch size, and for this purpose the specific easel employed may be conveniently 22 inches in diameter. This relationship of parts and dimensions permits the use of the illustrated embodiment with standard size enlargers arranged in the conventional manner shown in FIG. 1 of Florshiem U.S. Pat. No. 2,490,794, the disclosure pertaining to which is hereby incorporated herein by this reference.

The datum indicator 4, in the showings of FIGS. 1, 3 and 4 is a one piece component having an upper pointer portion 4A directed at the rim of bed 1, and a lower base portion suitably fixed to bed 2.

The scale B is preferably delineated on the easel bed 1 by employing luminous paint that will be visible in the totally dark environment that is required for printing color prints and in the filtered light that is required for making black and white prints. In the preferred embodiment, the easel bed is painted yellow and the lines delineating the scale B are green in color. The scale delineating lines involved intersect at the axial center A1 of the bed 1, as indicated in FIG. 2, about which the bed 1 is rotated when it is to be adjusted in accordance with the practice of the invention in providing the indicated multiple image prints.

The relationship of the individual masks 11, the easel bed scale B, its datum zero line C, and the stationary datum indicator 4, will be made clear by the description of the manner of using the method of the invention, which for illustrative purposes will be described with reference to the mask shown in FIG. 13 and has its open sector of 90 degree angulation whereby practicing the invention using the mask of FIG. 13 four images will be formed on the paper 10 in a circular manner about the paper 10 employed.

Preliminary to the practice of the invention is setting up of the correct light conditions for the type of photographic printing involved. The device A is positioned under a conventional enlarger, such as that referred to above, so that the projection of the negative image that is made when the enlarger is operating will be directed at the easel bed, and at, and in centered relation with, the zero datum line C in intermediate centered relation with line C between the rim of bed 1 (at the lower side of FIG. 2) and the bed rotational axial center or pivot axis 1A. As part of this positioning, bed 2 should be adjusted to align the datum marker with the 315 degree angulation line of scale B (that is measured from the datum zero line C).

Of course, the necessary printing time (exposure) and lense aperture (for the enlarger) are determined for the particular prints to be made.

For black and white prints a suitable safe lighting condition is appropriate, and it will be assumed that this is employed. The negative to be used in the enlarger is suitably composed therein and the easel bed 1 is adjusted as is necessary to be parallel to the negative in the enlarger. It is assumed that the bed 2 and the negative in the enlarger will be horizontally disposed, and under these conditions, the bed 1 will then be horizontally disposed, but in any event the bed 1 should be adjusted, using head 3, to be parallel to the plane of the negative as it is composed in the enlarger. A sheet of the printing paper 10 is applied to the easel 1 between the marginal pieces 8 that center the printing paper with respect to the easel bed 1. Since the mask of FIG. 13 is assumed to be employed, the mask 11 of FIG. 13 is now placed on top of the paper 10 and within the mask operating space that is defined by curvilinear guide walls 8E of the marginal pieces 8, as indicated in FIG. 9.

For setting the easel bed 1 at the first print exposing position, the scale delineation line for the 315 degree angulation (that is measured from the datum zero line C) is set or reset in alignment with the datum indicator 4, and the locking mechanism 3D of the head 3 tightened to set the bed against rotation, care being taken to be sure that bed 1 is in parallelism with the negative in the enlarger. The mask 11 is then moved about the axis of the bed 1 so as to dispose its left hand edge D in alignment with the easel bed 315 degree angle indicating line, which will dispose the opposing edge E of the mask sector involved in alignment with the 45 degree scale reading. This will locate the mask 11, and specifically its open sector with respect to the paper 10 for purposes of making the first exposure on the paper 10. The bed 1 in being positioned for the aforementioned correct application thereto of the negative image by the enlarger will be correctly indexed with the enlarger, and the datum indicator and mask will have now been correctly indexed with respect to bed 1.

After the first exposure has been completed, the head 3 is loosened to permit rotation of the bed 1 in its operating plane (without tilting), and the bed 1 is moved clockwise to bring its 45 degree angle indicator line in alignment with the datum indicator 4. The head is again relocked to prevent further rotational movement of the bed 1, the mask 11 being employed is then moved counterclockwise to bring its open sector edge D in alignment with the bed scale 45 degree angle indicating line, which disposes the edge E in alignment with the 135 degree reading of the scale B. It will be apparent that the quadrant of the paper 10 that succeeds the first exposed quadrant of the paper 10 is now in position to be exposed, and the second image therefor is applied to the paper 10 by suitably operating the enlarger for this purpose.

The third exposure is made in the third quadrant of the paper 10 by loosening the movement restraining locking means of the head 3 and rotating the easel bed 1 to dispose the 135 degree scale indicator line in alignment with the datum indicator 4, again moving the bed clockwise for this purpose. When the bed is relocked in this position, the mask 11 is shifted counterclockwise to dispose its sector edge D at the 135 degree indicating line of the scale B and its section edge E at the 225 degree scale indicator line. After applying the third image to the third quadrant of the paper 10, the same procedure is employed to apply the fourth image to the fourth quadrant of the paper 10 by positioning the bed 225 degree scale indicator line in alignment with the datum indicator 4 (moving the bed 1 clockwise for this purpose), and then similarly repositioning the indicated mask 11 in a counterclockwise direction to expose the fourth quadrant of the paper 10 for application of the fourth image thereto.

The paper 10 now being fully exposed, the mask 11 that has been employed is removed, and the paper 10 developed using conventional practices to complete the formation of the images on the paper 10.

It will thus be seen that with regard to the mask 11 of FIG. 13, which is to provide four images on the paper 10 when operated in accordance with the Applicant's indexing system, the datum zero line C of scale B bisects the sector of scale B represented by the 90 degree angulation between the 45 degree and the 315 degree scale indicating markings. When using the four image mask 11 of FIG. 13, the starting position of the easel bed 1 with respect to the datum indicator 4 is in alignment with the scale line indicated for the 315 degree subdivision, and vice versa, assuming that bed 1 is oriented with respect to the enlarger so that the negative image will be centered on the datum zero line C, as previously described.

When practicing this aspect of the invention, the datum indicator 4 is always to be disposed to the left hand side of the datum zero line C to set the easel bed and marker in their proper image taking relation, and the bed rotated clockwise to move it to the next image application position. The mask 11 employed is always shifted counterclockwise of the bed to reposition its section defining edges D and E with respect to the newly set positions of the respective 90 degree subdivision lines of the scale B (that is, the 45 degree, 135 degree, 225 degree, and 315 degree scale lines) in using the four image mask of FIG. 13.

The masks 11 of FIGS. 12, 14 and 15 when used in connection with the easel bed 1, its scale B, and the datum indicator 4 follow the same principles.

For instance, with regard to the mask 11 of FIG. 12, this is the three image mask, and the mask open sector is of 120 degree angulation. 120 degrees divided into 360 degrees leaves the required whole number quotient of three, in accordance with the invention, whereby practice of the invention in association with the mask of FIG. 12 will provide three images on the paper 10. The 120 degrees represented by the acute angle that is formed by the 60 and 300 line markings of the scale B is bisected by the datum zero line C.

In making the three images on the paper 10 using the mask of FIG. 12, the bed 2 is repositioned so that the datum marker will be aligned with the 300 degree scale line of the bed 1 is properly oriented with the enlarger so that the projected negative image will be centered on the datum zero line C (as hereinbefore described). The same general procedure is then followed in the making of the three images on paper 10; thus after the first image is applied to the paper 10 through the mask open sector, the scale lines of scale B for the 60 degree, and 180 degree scale readings are consecutively set in alignment with the datum indicator 4, with the easel bed 1 being moved clockwise for this purpose and the mask 11 of FIG. 12 being moved counterclockwise to consecutively expose the three consecutive image positions that will be provided on the underlying paper 10.

In connection with the use of the mask 11 of FIG. 14, the open segment of this mask is 60 degrees in angulation with 60 degrees dividing into 360 degrees to provide the required whole number quotient of six. The scale B in practice will include subdivisions for the relocations of 30, 150, 210, and 330 readings of scale B. The datum zero line C bisects the 60 degree angle reading between the scale gradation lines 330 and 30; using the mask 11 of FIG. 14, the same general procedure is followed, with the datum marker being consecutively set at the 330, 30, 90, 150, 210, and 270 scale markings of scale B, as the images are consecutively made on the paper 10, in the six positions provided for by the mask of FIG. 14, with the easel 1 being moved clockwise and the mask 11 being moved counterclockwise, as aforedescribed, to shift the paper 10 between consecutive exposing positions and open such paper exposing positions to exposure by enlarger through the open section of the mask 11.

With regard to the mask 11 of FIG. 15, this mask is an eight image mask and the open sector of the mask is 45 degrees in angulation. 45 degrees divides into 360 degrees with a whole number quotient of eight, in accordance with the invention. For utilizing the mask of FIG. 15, scale B will have scale markings for required positions at 22.5, 67.5, 157.5, 202.5, 247.5, 292.5, and 337.5, degree positions. In progressing the easel bed 1 through the eight image exposing positions of the paper 10 carried thereby utilizing the mask of FIG. 15, the easel bed has the following scale subdivisions positioned consecutively in alignment with the datum indicator 4: 337.5, 22.5, 67.5, 112.5, 157.5, 202.5, 247.5, and 292.5, with the mask 11 of FIG. 15 being moved counterclockwise after each such positioning of the easel bed 1 to expose the next consecutive unexposed portion of the paper 10 through the mask open section illustrated in FIG. 15.

With regard to the initial positioning in each instance of the datum marker 4 with respect to the bed 1 as set for correct application of the image to paper 10 (as determined by the indicated centering of the projected image with the bed scale datum zero line C) the datum marker may be movably mounted on bed C (for instance, as shown in FIGS. 10 and 11), with base 2 then being properly centered with respect to the enlarger image projection, and base 2 bearing its own scale for setting the marker 4 to index same properly for the three, four, six and eight image forming procedures above described. It is then necessary to only set the bed 1 at the adjusted position of marker 4 to index device A for use with a particular mask 11.

If desired, the easel device A can be employed to print directly on the paper 10 without the benefit of masks 11 where the image is proportioned to susbtantially cover the paper 10 as applied to easel bed 1. For this purpose, the paper 10 is applied to the easel bed 1 as described and the axial center of the easel bed is aligned with the center of the image to be projected on the paper. The easel bed, of course, will be adjusted rotationally so that the margins of the paper will be aligned with the margins of the image.

Figure 6:
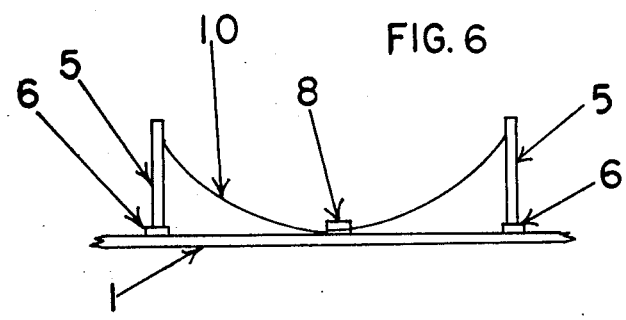
FIG. 6 is a fragmental sectional view taken substantially along line 6—6 of FIG. 5, but showing the implements of FIG. 3 applied thereto, for disposing the printing paper in a concave position for exposure purposes.
Figure 7:
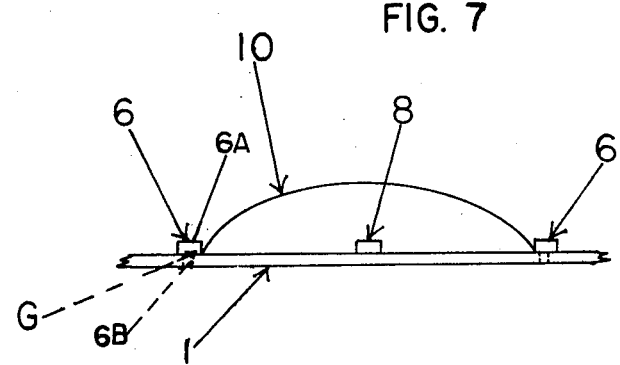
FIG. 7 is a view similar to that of FIG. 6, but shows the photographic paper positioned for convex exposure purposes.

Turning now to the paper edge stays 5 and 6, these implements are employed where it is desired to position the printing paper 10 in the alternate manners suggested in FIGS. 6 and 7.

The stays 6 are of annular configuration having a bolt like outline, in the form illustrated, including a collar or head portion 6A and a tubular stud portion 6B that may be frictionally received in the openings G provided in easel bed 1 for this purpose. In the showing of FIG. 5, the location of the stays 6 is indicated by the location of the openings G, with the stays 6 actually being omitted from the showing of FIG. 5. The openings G for stays 6 are spaced to mount a 11 by 14 inch sheet 10 of print paper in the convex position of FIG. 7, with the edge of the paper seated against the abutment provided by the lower corner rims of the stay bodies 6A. For this purpose the paper 10 in being applied as indicated in FIG. 6 is centered lengthwise thereof with respect to the axis of the easel 1 which accordingly is centered with respect to the image projection from the enlarger.

The stays 5 are employed in conjunction with the stays 6 for positioning the printing paper 10 in the concave position of FIG. 6. The stays 5 may be of either tubular or solid rod form and are of a diameter for friction fitting into the bores of stays 6. The stays 5 in the form shown are each formed with an upwardly angled slot H into which the side edges of the paper 10 are lodged in the manner suggested in FIG. 6. In using the stays 5, their lower ends are applied to the stays 6 with the stays 5 on one side of the easel being disposed so that their slots H are in coplanar relation, while the stays 5 on the other side of the easel bed are similarly positioned. The stays 5 are proportional such that when applied to the respective stays 6 for use in the manner indicated in FIG. 6, the printing paper sheet 10 at its mid portion will be in light engagement with the upper surface of the easel bed 1 and its side edges to the right and to the left of FIG. 6 will be lodged in the respective slots H, whereby the sensitized surface of the printing paper 10 will be concavely disposed for application thereto of an image from the enlarger employed.

The stays 7 are identical to stays 6 but they are applied to the easel board openings indicated by reference letter J of FIG. 5 so as to hold in printing position a sheet of 11 by 14 printing paper flat against the easel bed for conventional type flat plane printing purposes. It is to be noted that the stays 7 include one at either end of the thus positioned printing paper so that such paper is held in printing position when the easel is tilted for printing purposes. In the showing of FIG. 5, the location of stays 7 is indicated by reference numeral 7, the stays 7 not being actually shown.

As indicated, the stays 5, 6 and 7 are not employed when the multiple image printing procedures heretofore described are employed. When the bed 1 is used for tilted printing, after the stays 7 are in the position suggested by FIG. 5 and the paper 10 has been applied between the stays 7, the head 3 is adjusted to provide the tilt desired in any position 360 degrees about the axis of bed 1, and then the head is locked in position for application thereto of the image from the negative.

As indicated, the stays 5 are preferably formed from brass or its equivalent, while the stays 6 and 7 are formed from a suitable plastic or elastomeric material and proportioned to frictionally receive the stays 5 but permit ready disassembly as needed.

In an alternate embodiment, the individual stays 5 are equipped with their own mounting bases in the form of a stay 6 suitably affixed thereto, with the stays 5, instead of having the slots H formed herein, have applied to their upper ends conventional solderless wire connectors, formed from a suitable plastic material, which act like a cap and provide the paper holding function of the slots H when the edges of the paper 10 are seated under the rims of the indicated caps.

The specific configuration of the bodies 6A of the stays 6 may be frustoconical in addition to the cylindrical configuration indicated in the drawings, with the bodies tapering towards reduced dimension upwardly of the easel bed 1.

The head 3 is only diagrammatically illustrated, and as it may be of the type employed in conventional photographic tripods of medium duty weight conventional arrangement whereby the head can be rotated 360 degrees in either direction, and tipped or tilted to the angulation permitted by the spacing of the easel bed 1 from the base 2. Suitable locking means are employed to lock the head both against rotation and tilting.

It will be appreciated that the size of the easel device A can be varied in accordance with the size of the prints to be printed, the specific printing paper dimensions referred to being employed as illustrative of the practical embodiment of the invention.

With regard to the showing of FIGS. 10 and 11, this embodiment illustrates an adjustable mounting for the datum indicator or pointer 4. Reference numeral 12 illustrates a two rail track that has a one half inch wide spacing between the rails involved at the center of the track. The indicator pointer 4 in this form has a shaft of shank extending from the level of the easel bed 1 to the easel base 2 upon which the track 12 is mounted in the manner suggested in FIG. 11. The base portion of the shank of the indicator 4 is bent 90 degrees at the position on the top of the base 2 and includes an upwardly directed indentation that is slidably received within the indicated gap between the track rails, with the end of the shank underlying the inner track rail, with the extreme tip being upwardly angled so as to be perpendicular to the base 2. The proportioning of parts is made such that indicator 4 may be moved along its track 12 for the aforementioned adjustment purposes, but is frictionally held against displacement when so adjusted. The track 12 is proportioned such as the adjustment permissible is over an arc of 120 degrees.

To facilitate handling of the masks 11, sutable hand grips may be applied thereto along their respective sector edges D and E. In a practical embodiment angle bars of suitable thickness are adhered to the masks along such edges to facilitate shifting of the masks relative to the easel.

It will therefore be seen that the invention provides a system, method, and device for making multi images one at a time in a circular manner about the center of a sheet of printing paper with the indexing system involved minimizing the moving parts required and permitting professional looking work by amateurs with minimal printing experience. The basic parts involved are the easel bed and the masks which are moved in the indexing procedure and the indicator that cooperates therewith.

The easel arrangement also is equipped to provide for mounting of the printing paper in convex or concave printing configurations as well as flat printing composition, in addition to provide for tilting of the easel bed relative to the direction of projection of the image from the enlarger, all for special effects that may be provided as the operator chooses to utilize these optional ways of printing, either separately or in combination, as best suits the intended purpose.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:
1. A photographic printing easel device comprising:
a circular bed mounted for rotational movement about its central axis and defining a generally planar top surface against which photographic printing paper may be laid,
means for indexing the printing paper centrally of the bed when the paper is applied thereto in its exposing position,
a mask of circular form having its outer rim edge of a diameter less than that of said bed,
said bed having on said surface a plurality of indexing elements radially spaced about said bed and at equal distances from said bed axis, which distances equal the radius of said mask,
said indexing elements being formed on their sides facing said axis to comprise said indexing means and including means for seating the printing paper against said bed surface and in movement restraining relation with said indexing elements when the printing paper is applied in its exposing position,
said indexing elements being further formed to define like coplanar seating lands paralleling and above said bed surface and like upstanding outer guide walls struck on an arc that complements that of said mask edge for seating the mask on said bed over the printing paper, when in its exposing position, in engagement with said seating lands and between said guide walls for journalling the mask on the bed for rotational movement about said bed axis, relative to said bed,
said mask being formed from light opaque material and being shaped to define an open sector defining spaced apart side edges that are radially disposed with respect to said mask and that are at an angle that divides into 360 with an equal whole number quotient,
said bed surface having delineated thereon a scale comprising a plurality of angular subdivisions ex- tending radially of said bed of which adjacent of said subdivisions are at said angle at said bed axis, said bed surface being further delineated to define a zero datum extending radially of said bed surface and bisecting the space between two of said angular subdivisions to form an initial printing position of said bed with which said mask sector may be aligned for photographic printing exposure purposes over the printing paper by aligning the mask sector side edges with those of said angular subdivisions next adjacent to said datum zero on either side of said datum zero, and a datum marker adjacent the bed rim with which said bed surface angular subdivisions may be consecutively aligned to orient said bed and said mask at consecutive printing positions of said bed corresponding in number to said quotient number, whereby the printing paper may have applied thereto consecutively in a circular pattern about said bed axis a number of images equal in number to said quotient number by, after one of said image exposure has been made on the paper, consecutively shifting said easel about its axis in one direction about said axis to consecutively dispose said angular subdivisions in alignment with said datum marker and then shifting said mask about said axis in the other direction to expose through the mask sector the next adjacent sector of the printing paper that is to have the next image to be applied thereto.

2. The photographic printing easel device set forth in claim 1 wherein:

said bed is mounted on a base that is horizontally disposed, and including means for releasably locking said bed against movement about said axis, and means for releasably securing said bed in parallelism to said base and at varient acute angles relative thereto 360 degrees about said axis.

3. The photographic printing easel device set forth in claim 2 wherein:

said datum marker is secured to said base.

4. The photographic printing easel device set forth in claim 2 wherein:

said bed surface in the area thereof bounded by said indexing elements being formed to mount a plurality of printing paper stays in a quadrilateral pattern that is centered on said bed axis, said stays each comprising a rounded body upper portion and a lower peg portion of less thickness than said body portion, said bed being recessed to frictionally receive said stay peg portions and define said quadrilateral pattern with said stays disposed in two parallel rows that are separated by a dimension that is less than the width of a photographic printing paper that is to have arced pointing images applied thereto, said stays including means for setting a pair of opposed printing paper edges thereagainst for shaping the paper that is to have arced images applied thereto in an arced configuration for forming arced printing images thereon.

5. The photographic printing easel device set forth in claim 4 wherein:

said stay body portions define lower corner portions against which the arced paper opposed edges are lodged for forming convex images thereon, and comprising said setting means.

6. The photographic printing easel device set forth in claim 4 wherein:

said stays each include an upstanding post formed adjacent their upper ends to define abutments against which the arced paper opposed edges are lodged for forming concave images thereon, and comprising said setting means.

7. A photographic printing easel device comprising:

a portable base, a circular bed mounted on said base for rotational movement about its central axis and defining a generally planar top surface against which photographic printing paper may be laid, means for indexing the printing paper centrally of the bed when the paper is applied thereto in its exposing position, a mask of circular form having its outer rim edge at a diameter less than that of said bed, said bed having on said surface a plurality of indexing elements radially spaced about said bed and at equal distances from said bed axis, which distances equal the radius of said mask, said indexing elements being formed on their sides facing said axis to comprise said indexing means and including means for seating the printing paper against said bed surface and in movement restraining relation with said indexing elements when the printing paper is applied in its exposing position, said indexing elements being further formed to define like coplanar seating lands paralleling and above said bed surface and upstanding outer guide wall struck on an arc that complements that of said mask edge for seating the mask on said bed over the printing paper, when in its exposing position, in engagement with said seating lands and between said guide walls for journalling the mask on the bed for rotational movement about said bed axis relative to said bed, said mask being formed from light opaque material and being shaped to define an open sector defining spaced apart side edges that are radially disposed with respect to said mask and that are at an angle that divides into 360 with an equal whole number quotient, said bed surface having delineated thereon a scale comprising a plurality of angular subdivisions extending radially of said bed of which adjacent of said subdivisions are at said angle at said bed axis, said bed surface being further delineated to define a zero datum extending radially of said bed surface and bisecting one of said angular subdivisions to form an initial printing position of said bed with which said mask sector may be aligned for photographic printing exposure purposes over the printing paper, by aligning the mask sector side edges with those of said angular subdivisions next adjacent to said datum zero on either side of said datum zero, and a stationary datum marker mounted on said base and disposed adjacent the bed rim with which said bed surface angular subdivisions may be consecutively aligned to orient said bed and said mask at consecutive printing positions of said bed corresponding in number to said quotient number, whereby the printing paper may have applied thereto consecutively in a circular pattern about said bed axis a number of images equal in number to said quotient number by, after one of said image exposure has been made on the paper, consecutively shifting said easel about its axis in one direction about said axis to consecutively dispose said angular subdivisions in alignment with said datum marker and then shifting said mask about said axis in the other direction to expose through the mask sector the next adjacent sector of the printing paper that is to have the next image to be applied thereto, means for releasably locking said bed against movement about said axis, and universal joint means interposed between said bed and said base including means for locking said bed at predetermined positions relative to the horizontal.

8. The method of forming a plurality of images of a predetermined number on photographic printing paper in a circular manner about the center of the paper, which method comprises:

taking a photographic easel bed mounted for rotational adjustment movement about a vertical axis and having an upwardly facing surface formed to define a scale comprising a plurality of angular subdivisions extending radially of said bed of which adjacent of said subdivisions are at an angle at said bed axis that divides into 360 with a whole number quotient equal to said number, said bed surface being further delineated to define a zero datum extending radially of said bed surface and bisecting the space between two of said angular subdivisions to form an initial printing position of said bed, applying the printing paper on the bed in centered relation thereto, taking a circular mask proportioned to cover said paper and formed to define an open sector defining spaced apart side edges that are radially disposed relative to the mask and at said angle with respect to each other, and shiftably positioning said mask on the bed over the paper in said initial printing position with the mask axis aligned with the bed axis, and the mask sector aligned with said one angular subdivision, by aligning the mask sector side edges with those of said angular subdivisions next adjacent to said datum zero on either side of said datum zero, making the initial printing exposure on the paper through the mask sector, and then consecutively shifting the easel bed about its axis in one direction to consecutively dispose said angular subdivisions in alignment with a stationary datum marker, shifting the mask about said axis in the other direction to expose through the mask sector the next adjacent sector of the paper that is to have the next image to be applied thereto, and forming such image on the paper to complete the formation of said number of images on said paper.

* * * * *